United States Patent [19]
Theurer et al.

[11] Patent Number: 6,007,050
[45] Date of Patent: Dec. 28, 1999

[54] MACHINE FOR LAYING AN OVERHEAD LINE OF A TRACK

[75] Inventors: Josef Theurer, Vienna; Leopold Rudolf Gruber, Scheibbs, both of Austria

[73] Assignee: Franz Plasser Bahn Bauhaschinen-Industriegesellschaft M.B.H., Wien, Australia

[21] Appl. No.: 09/128,533

[22] Filed: Aug. 4, 1998

[30] Foreign Application Priority Data

Aug. 21, 1997 [AT] Austria .................................. 1406/97

[51] Int. Cl.⁶ .................................................. B65H 59/00
[52] U.S. Cl. ..................................................... 254/134.3 R
[58] Field of Search ................... 254/134.3 PA, 254/134.3 FT, 134.3 R; 242/397.1, 398, 388.6, 397.3, 403, 155 BW

[56] References Cited

U.S. PATENT DOCUMENTS

| | | | |
|---|---|---|---|
| 5,048,797 | 9/1991 | Theurer et al. | 254/134.3 R |
| 5,209,457 | 5/1993 | McVaugh | 254/134.3 FT |
| 5,826,860 | 10/1998 | Theurer et al. | 254/134.3 R |

*Primary Examiner*—Robert C. Watson
*Attorney, Agent, or Firm*—Horst M. Kasper

[57] ABSTRACT

A machine for laying a catenary cable or a contact wire of an overhead line extending above a track comprises a machine frame supported on undercarriages for mobility along the track, a storage drum mounted on the machine frame and carrying a reel of the catenary cable or contact wire to be paid out from the storage drum, and a guiding device for the paid-out catenary cable or contact wire. The guiding device is pivotable about a horizontal axis extending in the longitudinal direction of the machine frame and comprises a supporting mast having a longitudinal axis, a guide roller mounted to the supporting mast and arranged to be engaged by the paid-out catenary cable or contact wire, a drive for vertically adjusting the guide roller, and a drive for pivoting the guiding device about the horizontal axis. The guide roller is designed for adjustment relative to the supporting mast in a direction extending perpendicularly to the longitudinal axis thereof and transversely to the longitudinal direction of the machine frame, and a drive is provided for transversely adjusting the guide roller relative to the supporting mast.

10 Claims, 3 Drawing Sheets

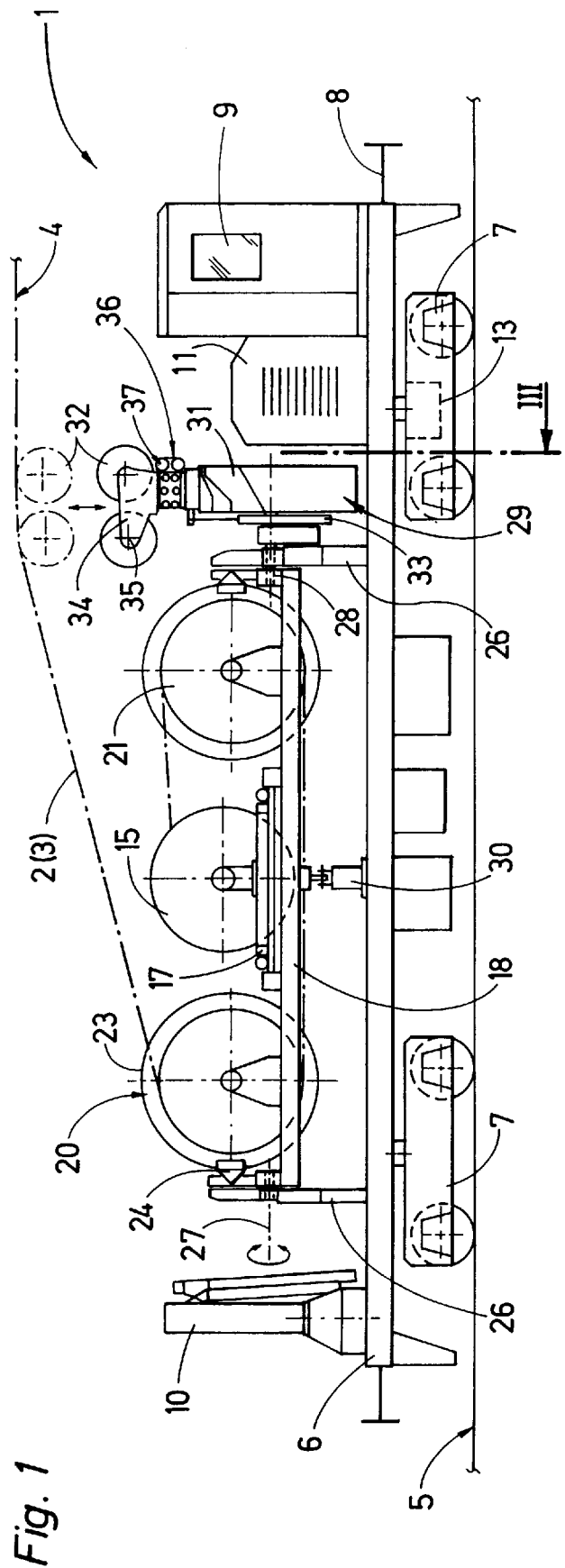
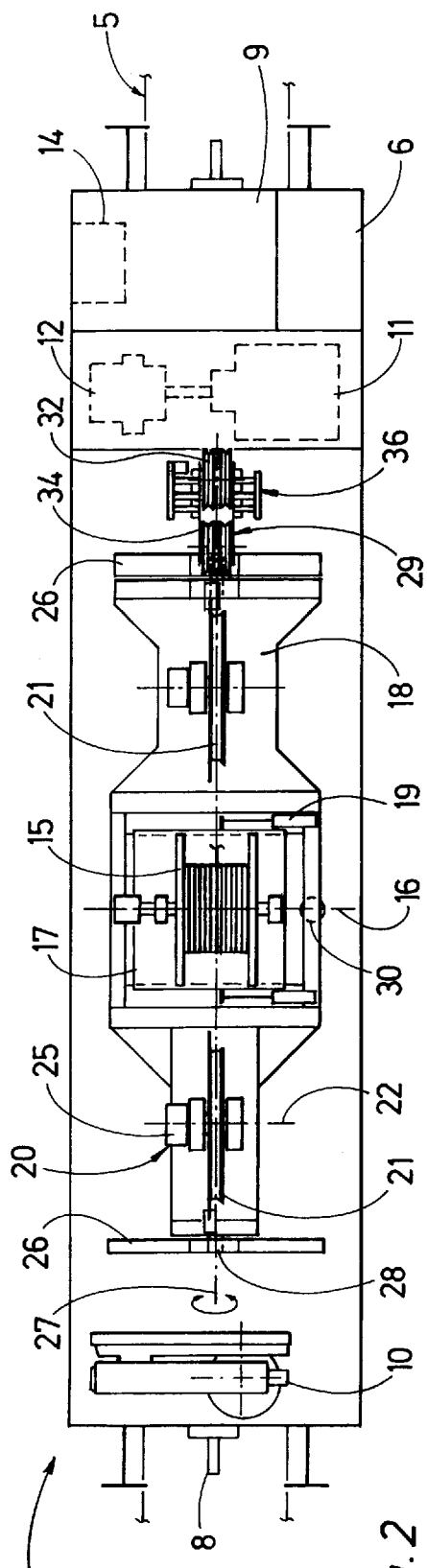
Fig. 1
Fig. 2

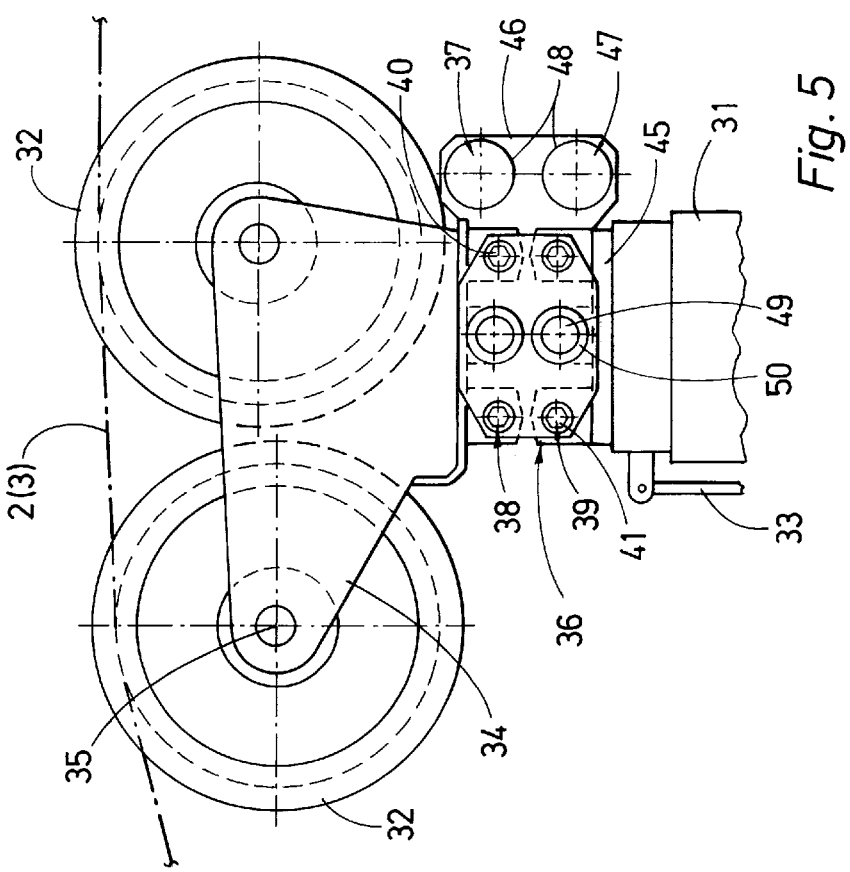
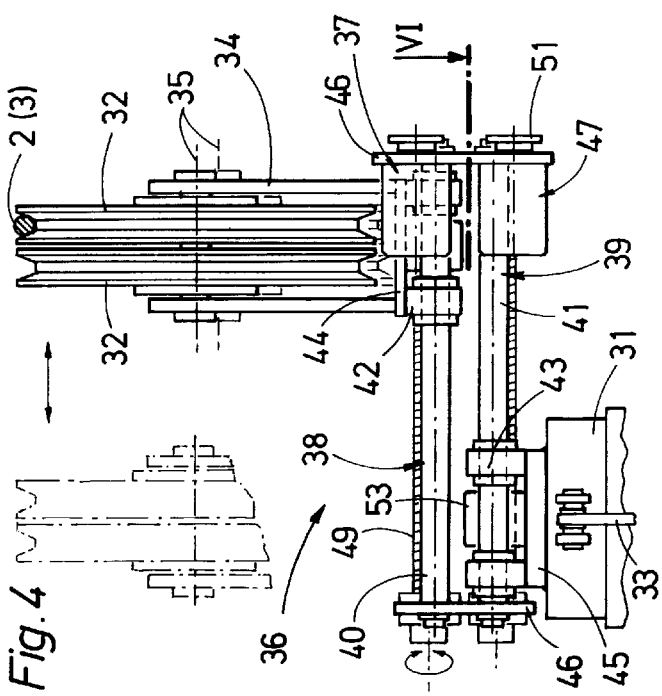

MACHINE FOR LAYING AN OVERHEAD LINE OF A TRACK

BACKGROUND OF THE INVENTION

1. Field of the Invention

The present invention relates to a machine for laying an elongated flexible element of an overhead line extending above a track, the elongated flexible element being a catenary cable or a contact wire, which comprises a machine frame extending in a longitudinal direction and supported on undercarriages for mobility along the track, a storage drum mounted on the machine frame and carrying a reel of the elongated flexible element to be paid out from the storage drum, and a guiding device for the paid-out elongated flexible element, the guiding device being pivotable about a horizontal axis extending in the longitudinal direction and comprising a supporting mast having a longitudinal axis, a guide roller mounted to the supporting mast and arranged to be engaged by the paid-out elongated flexible element, a drive for vertically adjusting the guide roller, and a drive for pivoting the guiding device about the horizontal axis.

2. Description of the Prior Art

EP 0 776 780 A1 discloses a machine of this type, with which a contact wire or a catenary cable from which the contact wire is suspended may be installed in a single operation under the ultimately desired tension to provide an overhead line extending above a track. In doing so, the wire or cable is continuously paid out from a storage drum mounted on the machine frame and runs through a tensioning device before being positioned, by means of a guiding device, in the correct vertical and lateral position for final assembly. The guiding device consists of a supporting mast, telescopically extensible by means of a drive, at the upper end of which is arranged a freely rotatable guide roller provided with a groove for guiding the contact wire or catenary cable. The supporting mast and the storage drum, together with the tensioning device, are mounted on a pivoting frame which is pivotable by means of a drive about a horizontal axis extending in the longitudinal direction. Owing to the combination of said transverse pivoting with the vertical adjustment, the guide roller or rather the wire passing over the same can be positioned in the precise installation position which is required to obtain the desired zig-zag course of the overhead line.

Another machine for installation of an overhead line is described in EP 0 416 136 B1 and serves for jointly laying a contact wire and a catenary cable which are paid out from a respective storage drum mounted on the machine frame. The guiding device consists of a vertically adjustable jib crane with a boom, which is mounted on the machine frame for rotation about a vertical axis. The free end of the boom carries two guide rollers for respectively guiding the contact wire and the catenary cable. The fork-shaped mount for the guide rollers is movably connected to the boom in order to enable each guide roller to be individually turned about an axis extending approximately in the longitudinal direction of the track during the required lateral rotation of the crane.

According to U.S. Pat. No. 4,213,596, it is known to mount the storage drums and the vertically and transversely adjustable guiding device(s) for a contact wire and/or a catenary cable on respective, separate rail vehicles which are coupled in operation to form a work train. The guiding device consists of a roller apparatus over which the wire is guided and which is arranged on a vertically adjustable support frame for transverse adjustment by means of a spindle drive. The support frame, in turn, is mounted on a work platform which is vertically adjustably connected to the rail vehicle.

Another machine, known from AT-B-398 737, is equipped with two storage drums, one for a contact wire and one for a catenary cable, with a separate, independently operable guiding device being associated with each storage drum respectively. The guiding devices are in the shape of vertically adjustable booms which are mounted on the machine frame for lateral pivoting and carry a guiding and clamping device at their free ends.

Finally, DE-A-20 12 248 describes a machine for assembling an overhead line, having a guiding device containing a respective guide roller for a contact wire and a catenary cable. These two guide rollers, arranged one above the other, are designed for telescopic adjustment vertically as well as horizontally by means of a device fastened to the machine frame.

SUMMARY OF THE INVENTION

It is the primary object of this invention to provide a machine of the first-described type which enables an overhead line to be installed accurately and without difficulty under the most diverse working conditions.

The above and other objects are accomplished in a machine of the first-indicated type according to the invention by designing the guide roller for adjustment relative to the supporting mast in a direction extending perpendicularly to the longitudinal axis and transversely to the longitudinal direction, and providing a drive for transversely adjusting the guide roller relative to the supporting mast.

Such a design of the guiding device makes it possible in an advantageous way to transversely adjust the guide roller over a greater distance in addition to the maximum transverse pivoting carried out by means of the pivot drive. The range of adjustment of the guiding device in the direction transversely of the track is thereby increased, thus promoting an even more precise positioning of the contact wire. The relative adjustment between guide roller and supporting mast proves particularly advantageous, however, when installing the catenary cable, the continuous guiding of which in the longitudinal direction may turn out problematic due to its positioning above the post bracket of the catenary mast. As a result of the design according to the invention, it is now possible to simply circumvent the bracket with the supporting mast to avoid a collision and yet, by transverse displacement of the guide roller, to place or keep the catenary cable precisely in the correct vertical and, particularly, the horizontal position required for assembling the overhead line.

According to a preferred embodiment, the machine further comprises a roller bracket on which the guide roller is mounted, and a transverse displacement device by means of which the roller bracket is adjustably connected to the supporting mast which is telescopically extensible by means of the drive for vertically adjusting the guide roller. Most advantageously, the transverse displacement device is composed of a first and a second transverse guide, of which the first transverse guide is displaceably mounted to the roller bracket while the second transverse guide is displaceably mounted to the supporting mast. This assures great versatility in adjusting the position of the guide roller to respond to any situation which may be encountered during the installation operation.

BRIEF DESCRIPTION OF THE DRAWING

The above and other objects, advantages and features of the present invention will become more apparent from the following detailed description of a now preferred embodiment thereof, taken in conjunction with the accompanying drawing wherein FIGS. 1 and 2 are, respectively, side elevational and top views of a machine for laying a contact wire or a catenary cable of an overhead line extending above a track;

FIGS. 4 and 5 are side elevational views of the guiding device of this invention in the longitudinal and transverse directions, respectively; and FIG. 6 is a top view, partly in section, along line VI of FIG. 4.

DETAILED DESCRIPTION OF PREFERRED EMBODIMENT

Figure 3:
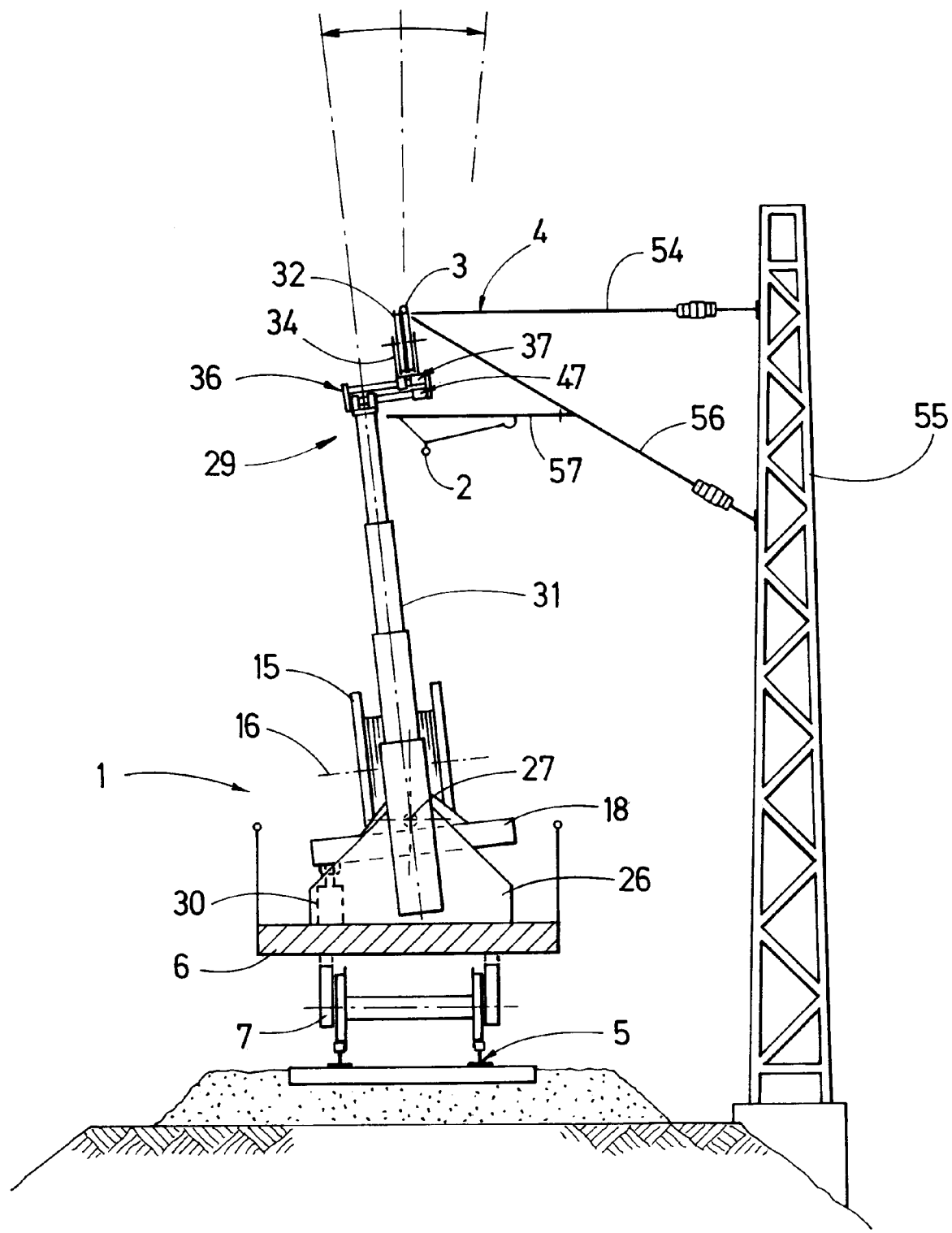
FIG. 3 is an end view, partly in section, along line III of FIG. 1.

Referring now to the drawing and first to FIGS. 1 and 2, there is shown a machine 1 for laying an elongated flexible element of an overhead line 4 extending above a track 5. The elongated flexible element may be a contact wire 2 or a catenary cable 3. The machine comprises a machine frame 6 extending in a longitudinal direction and supported on two undercarriages 7 for mobility along track 5. A driver's or operator's cab 9 and a vertically and laterally pivotable crane 10 are mounted on machine frame 6, and the machine frame ends have couplings 8 so that the machine 1 may be incorporated into a work train. Motor 11 and hydraulic assembly 12 serve to deliver power to a motive drive 13 of machine 1 and to all the other operating drives, to be described hereinafter, which are remote-controlled by a control 14 arranged in cab 9.

A storage drum 15 is mounted on machine frame 6 and carries a reel of the elongated flexible element (i.e. contact wire 2 or catenary cable 3) to be paid out from the storage drum. As shown, the storage drum is mounted on a carriage 17 for rotation about a horizontal axis 16 extending transversely to the machine frame. The carriage 17 is mounted on a pivoting frame 18, and drives 19 are connected to the carriage to enable it to be transversely displaced relative to the pivoting frame 18.

A tensioning device 20 is connected to pivoting frame 18 and is arranged adjacent to storage drum 15 to direct the paid-out elongated flexible element from the storage drum to a guide roller 32 under a selected tension. The tensioning device 20 comprises two deflecting rolls 21 spaced from the storage drum 15 in the longitudinal direction and about which the elongated flexible element is wound. The deflecting rolls 21 are mounted for rotation about axes 22 which extend parallel to axis 16. One of the deflecting rolls 21 has a brake disk 23 actuatable by a braking device 24. To maintain a constant tension of the elongated flexible element, the deflecting rolls 21 are each rotated by a hydraulic motor 25.

As shown also in FIG. 3, the pivoting frame 18 is mounted on the machine frame 6 on two supports 26, 26 between the cab 9 and the crane 10 and is journaled in these supports for pivoting about a horizontal axis 27 extending in the longitudinal direction. This horizontal axis 27 extends through a shaft 28 which is journaled in the supports 26 and on which the pivoting frame 18 is tiltable like a cradle. One of the two shafts 28, which extend in the direction of the longitudinal extension of the machine frame 6, projects from a side of the support 26 opposite the side facing the pivoting frame 18 and serves as a bearing for a guiding device 29 which is rigidly connected to the shaft 28—and thereby to the pivoting frame 18—for rotation therewith. In this way, the guiding device 29 for the contact wire 2 or the catenary cable 3 is pivotal about horizontal axis 27 extending in the longitudinal direction. A pivot drive 30 is connected to pivoting frame 18 and machine frame 6 for pivoting the pivoting frame 18 together with the guiding device 29 about axis 27, the guiding device 29 being mounted on the pivoting frame.

The guiding device 29 essentially consists of a supporting mast 31, telescopically vertically adjustable by means of a drive 33, and guide rollers 32 arranged at the upper end thereof for guiding the contact wire 2 or catenary cable 3 paid out from the storage drum 15. The total of four guide rollers 32 are fastened on a roller bracket 34 in an arrangement of two pairs, positioned one following the other in the longitudinal direction, each pair having two coaxially arranged rollers, and are freely rotatable about axes 35 aligned in the transverse direction of the machine. The axis 35 of the one pair of rollers is slightly offset in the vertical direction from the axis 35 of the other pair. The roller bracket 34, for its part, is connected to the supporting mast 31 by means of a transverse displacement device 36 and is designed for adjustment relative to said supporting mast 31 by means of a transverse adjustment drive 37 or 47 in a direction extending perpendicularly to the longitudinal axis of the supporting mast 31 and transversely to the longitudinal direction of the machine frame.

As becomes clear now from FIGS. 4 to 6, the transverse displacement device 36 is composed of a first transverse guide 38 and, arranged thereunder, a second transverse guide 39, each comprising two transverse guide posts 40 or 41 spaced from one another in the longitudinal direction and extending in the transverse direction of the machine. Two sliding sleeves 42,43 are mounted for transverse displacement on each of the transverse guide posts 40,41. The four sliding sleeves 42 of the upper, first transverse guide 38 are connected to a horizontal supporting plate 44 on which the roller bracket 34 with the guide rollers 32 is mounted. The sliding sleeves 43 of the lower, second transverse guide 39 are mounted on a supporting plate 45 which, in turn, is fastened to the upper end of the supporting mast 31. The transverse guide posts 40 of the first transverse guide 38 are spaced in the vertical direction from the transverse guide posts 41 of the second transverse guide 39. The ends—spaced from one another in the transverse direction of the machine—of the four transverse guide posts 40 and 41 are mounted on common, vertically arranged plates 46 and thus are fixed in their position relative to one another, forming a structural unit.

Associated with each of the two transverse guides 38 and 39 is a separate transverse adjustment drive 37 or 47, respectively, each being designed as a spindle 49 rotatable by means of a hydraulic motor 48. The spindles 49 extend parallel to the transverse guide posts 40,41 and are arranged between the latter and rotatably mounted on the vertical plates 46 in respective shaft bearings 50. The two hydraulic motors 48 are also fastened to one of the plates 46 and are connected to the respectively associated spindle 49 or to a driving pinion 51, rigidly mounted thereon, via a drive chain 52. Each spindle 49 is provided with a spindle nut 53. One of these two nuts is fixedly connected to the supporting plate 44 of the roller bracket 34 and the other one to the lower supporting plate 45.

Thus, actuation of the transverse adjustment drive 37 causes a transverse adjustment of only the roller bracket 34 on the transverse guide posts 40 of the first transverse guide 38 (see position shown in dash-dotted lines in FIG. 4), while actuation of the transverse adjustment drive 47 of the second transverse guide 39 causes a transverse displacement, relative to the supporting mast 31, of the entire unit formed by the two transverse guides 38 and 39 and the roller bracket 34 (see small arrows in FIG. 6). The mid-position can be seen in FIG. 2.

In operation of the machine 1—shown in FIG. 3—the guide rollers 32 of the guiding device 29 are displaced vertically by means of the drive 33 until the contact wire 2 or catenary cable 3, placed in the groove of the respective roller, is positioned in the correct vertical position for final mounting to a post bracket 54 of a catenary mast 55 (see position of the guide rollers 32 shown in dash-dotted lines in FIG. 1). With the machine 1 moving forward continuously under the power of motive drive 13, the contact wire 2 or the catenary cable 3 is now installed while being kept permanently at the pre-selected, final installation tension by means of the tensioning device 20.

If, for example, a catenary cable 3 is to be fastened to a bracket pipe 56, then a contact wire drawback arm 57 attached thereto constitutes an obstacle in the path of the supporting mast 31. In order to avoid said obstacle, the pivoting frame 18 together with the supporting mast 31, connected rigidly thereto and carrying the guiding device 29, is pivoted out laterally about the axis 27 by means of the pivot drive 30 as far as necessary. For re-positioning the catenary cable 3 back in the track center, as required, the roller bracket 34 with the guide rollers 32 is now displaced in the direction opposite to the pivoting direction by means of the transverse displacement device 36. To that end, the transverse adjustment drives 37 and/or 47 are actuated as needed to either adjust only the roller bracket 34 on the first transverse guide 38, or to displace the entire unit, formed by the first and second transverse guides 38,39, in the transverse direction of the machine relative to the supporting mast 31 until the carrying cable 3 can be guided in the desired position.

When installing a contact wire 2 (which is positioned lower with respect to the catenary cable), it is normally not necessary to employ the transverse displacement device 36. For producing the prescribed zig-zag course of the contact wire 2, it is merely required to pivot the pivoting frame 18, together with the supporting mast 31, to and fro about the horizontal axis 27 by means of the pivot drive 30.

What is claimed is:

1. A machine for laying an elongated flexible element of an overhead line extending above a track, the elongated flexible element being a catenary cable or a contact wire, which comprises
    (a) a machine frame extending in a longitudinal direction and supported on undercarriages for mobility along the track,
    (b) a storage drum mounted on the machine frame and carrying a reel of the elongated flexible element to be paid out from the storage drum,
    (c) a guiding device for the paid-out elongated flexible element, the guiding device being pivotable about a horizontal axis extending in the longitudinal direction and comprising
        (1) a supporting mast having a longitudinal axis,
        (2) a guide roller mounted to the supporting mast and arranged to be engaged by the paid-out elongated flexible element, the guide roller being designed for adjustment relative to the supporting mast in a direction extending perpendicularly to the longitudinal axis and transversely to the longitudinal direction,
        (3) a drive for transversely adjusting the guide roller relative to the supporting mast, and
        (4) a drive for vertically adjusting the guide roller, and
    (d) a drive for pivoting the guiding device about the horizontal axis.

2. The machine of claim 1, further comprising a roller bracket and a transverse displacement device, the guide roller being mounted on the roller bracket, the roller bracket being connected for adjustment via the transverse displacement device to the supporting mast which is telescopically extensible by means of the drive for vertically adjusting the guide roller.

3. The machine of claim 2, wherein the transverse displacement device is composed of a first and a second transverse guide, the first transverse guide being displaceably mounted to the roller bracket, and the second transverse guide being displaceably mounted to the supporting mast.

4. The machine of claim 3, wherein a separate transverse adjustment drive for adjusting the guide roller transversely to the longitudinal direction is associated with the first and second transverse guides respectively.

5. The machine of claim 3, wherein the first and the second transverse guides each comprise two transverse guide posts, spaced from one another in the longitudinal direction and extending transversely to the longitudinal direction.

6. The machine of claim 5, wherein the transverse guide posts of the first transverse guide are spaced in a vertical direction from the transverse guide posts of the second transverse guide.

7. The machine of claim 5, wherein the transverse adjustment drive is in each case arranged between the two transverse guide posts of the associated transverse guide.

8. The machine of claim 4, wherein the transverse adjustment drives are shaped as spindles extending parallel to the transverse guide posts, the spindles being rotatable by means of a respective hydraulic motor.

9. The machine of claim 8, wherein the spindle comprises a driving pinion which is connected to the hydraulic motor via a drive chain.

10. The machine of claim 2, wherein the roller bracket comprises two pairs of guide rollers, the guide rollers of each pair being arranged coaxially.

* * * * *

UNITED STATES PATENT AND TRADEMARK OFFICE
CERTIFICATE OF CORRECTION

PATENT NO. : 6,007,050
DATED : November 30, 1999
INVENTOR(S) : Josef Theurer and Leopold Rudolf Gruber It is certified that error appears in the above-identified patent and that said Letters Patent is hereby corrected as shown below:

Title page,
Item [73] Assignee,
Lines 1-3, delete "Bahn Baumaschinen-Industriegesellschaft M.B.H." and insert -- Bahnbaumaschinen-Industriegesellschaft m.b.H. --
Item [73] Assignee,
Line 3, delete "Australia" and insert --Austria --

Signed and Sealed this

Fourteenth Day of August, 2001

Attest:

NICHOLAS P. GODICI
Attesting Officer
Acting Director of the United States Patent and Trademark Office